UNITED STATES PATENT OFFICE.

JACOB REESE, OF PHILADELPHIA, PENNSYLVANIA.

METHOD OF UTILIZING IRON ORE.

SPECIFICATION forming part of Letters Patent No. 519,391, dated May 8, 1894.

Application filed January 23, 1894. Serial No. 497,761. (No specimens.)

*To all whom it may concern:*

Be it known that I, JACOB REESE, a citizen of the United States, residing at Philadelphia, in the county of Philadelphia and State of Pennsylvania, have invented certain new and useful Improvements in Utilizing Phosphoretic Iron Ore; and I do hereby declare the following to be a full, clear, and exact description of the invention, such as will enable others skilled in the art to which it appertains to make and use the same.

Prior to my present invention, phosphoretic iron ores have been rendered in part available for the production of pig metal therefrom, by crushing said ores and subjecting the crushed material to the action of magnetic separators for the purpose of abstracting the iron which is present in said ores as a magnetic oxide. By this procedure, about seventy-five per cent. of the ore is, in general, recovered in available form for pig metal manufacture, and the tailings, consisting of the remainder of the iron ore and the earthy constituents have, so far as I am aware, been rejected as worthless and accumulate at the mines as a waste product. The reason why a greater percentage of the iron ore has not been recovered by following the method referred to, is that in practice it is impracticable to utilize in the blast furnace a charge of ore of less average gage than coarse sand; and, consequently, it has been the custom to crush the material from the mine only to about that grade of fineness, with the result that the magnetic separator fails to remove the entire quantity of iron present. This is moreover, not only objectionable because of the loss of the iron thus unrecovered, but the presence of the iron in the tailings renders the latter unavailable for the manufacture of soluble superphosphates of a stable character by the use of sulphuric acid, and the tailings are not themselves reduced to a sufficient degree of fineness to be themselves available for plant food.

The object of my invention is to utilize the entire body of the ore as mined, so as not only to recover substantially all of the iron ore in form available for use in the manufacture of pig metal, but also to obtain tailings which can be utilized, either directly, or by the aid of sulphuric acid, as plant foods.

In carrying out my invention, I preferably proceed as follows: I first crush the iron ore as it comes from the mine to about the grade of coarse sand and subject it to the action of a magnetic separator, whereby about seventy-five per cent. or more of the iron is withdrawn from it. The tailings are then subjected to a second crushing operation and reduced to a finer grade. This finer grade is then passed through a magnetic separator and the iron withdrawn from it as far as the separator will effect that result. The tailings from this second magnetic separation are, if necessary, subjected to still further reduction and separation; the alternate reducing and separating operations being continued until the iron is withdrawn to the desired degree, whereupon the remainder of the tailings is pulverized so that seventy-five per cent. will pass through a sieve of one hundred and fifty mesh, and twenty-five per cent. through a one hundred mesh sieve. The iron thus abstracted, which is very low in phosphorus and other impurities, may be mixed together so as not to reduce the average gage materially below that available for use in the blast furnace, and may be sold at good paying figures to manufacturers of iron and steel, while the resultant pulverized tailings at the fineness mentioned will be found available as plant food when placed in the ground. Thus the entire body of ore mined can be utilized by separation into merchantable useful products, and made available for useful and profitable purposes, and the mines themselves relieved from the accumulation of immense mounds of waste material. When the phosphoretic iron ores are not magnetic or but slightly magnetic, they may be made sufficiently magnetic for the purposes of my invention by roasting or heating them in the presence of coal or other reducing material of a liquid or gaseous nature.

If it is desired to convert the insoluble phosphates of the tailings into soluble phosphate, I effect that result by treating them with sulphuric acid, which attacks the tribasic phosphate, taking from it two equivalents of calcium and forming sulphate of calcium, thus leaving the phosphoric acid present as a monobasic phosphate, which is soluble in water. If iron were present however, the sulphate of calcium thus formed would again be broken up by the iron, and the calcium would go back to the monobasic phosphate converting it into the insoluble condition again, and, moreover rendering the product mushy and sticky so that it cannot be distributed as conveniently or advantageously. It is therefore of prime importance that, as in my invention, the iron should be practically absent from the tailings treated by the acid.

Having thus described my invention, what I claim is—

1. The method of utilizing the entire contents of phosphoretic iron ores, which consists in first crushing the ores and magnetically separating therefrom the larger part of the magnetic oxide, secondly crushing the tailings still finer and magnetically separating therefrom a further portion of the magnetic oxide, continuing said alternate crushing and separating operations until the magnetic oxide has been substantially removed, and finally reducing the remaining tailings to a fineness sufficient for plant food; substantially as described.

2. The method of utilizing the entire contents of phosphoretic iron ores, which consists in first crushing the ores and magnetically separating therefrom the larger part of the magnetic oxide, secondly crushing the tailings still finer and magnetically separating therefrom a still further portion of the magnetic oxide, continuing said alternate crushing and separating operations until the magnetic oxide has been substantially removed, mixing together the separated iron ore of the various degrees of fineness incident to said operations, and finally reducing the remaining tailings to a fineness sufficient for plant food; substantially as described.

3. The method of utilizing the entire contents of phosphoretic iron ores, which consists in first crushing the ores and magnetically separating therefrom the larger part of the magnetic oxide, secondly crushing the tailings still finer and magnetically separating therefrom a further portion of the magnetic oxide, continuing said alternate crushing and separating operations until the magnetic oxide has been substantially removed, reducing the remaining tailings to a fineness sufficient for plant food, and converting the insoluble phosphates of said tailings into soluble phosphates by the use of sulphuric acid; substantially as described.

4. The method of utilizing the entire contents of phosphoretic iron ores, which consists in first crushing the ores and magnetically separating therefrom the larger part of the magnetic oxide, secondly crushing the tailings still finer and magnetically separating therefrom a further portion of the magnetic oxide, continuing said alternate crushing and separating operations until the magnetic oxide has been substantially removed, and finally reducing the remaining tailings until seventy-five per cent. thereof will pass through a sieve of one hundred and fifty mesh and the remainder through a sieve of one hundred mesh; substantially as described.

5. The method of utilizing the entire contents of phosphoretic iron ores, which consists in partially separating the magnetic oxide therefrom, then magnetically separating from the tailings substantially all of the remaining magnetic oxide, and then subjecting the said tailings to the action of sulphuric acid, whereby the product is prevented from assuming a sticky or mushy condition and from reverting to the insoluble condition; substantially as described.

6. The method of utilizing the entire contents of phosphoretic iron ores, which consists in magnetically separating therefrom the larger portion of the magnetic oxide, and reducing the tailings until seventy-five per cent. of said tailings will pass through a sieve of one hundred and fifty mesh and the remainder through a sieve of one hundred mesh; substantially as described.

In testimony whereof I affix my signature in presence of two witnesses.

JACOB REESE.

Witnesses:
ANDREW WHEELER, Jr.,
BENJ. T. LONGSTREET.